US012499652B1

(12) United States Patent
Maheshwari et al.

(10) Patent No.: US 12,499,652 B1
(45) Date of Patent: Dec. 16, 2025

(54) IMAGE DIFFERENCE GENERATOR WITH SHIFT DETECTION

(71) Applicant: BrowserStack Limited, Dublin (IE)

(72) Inventors: Chinmay Maheshwari, Indore (IN); Amit Singh Sansoya, Nawanshahr (IN); Shivam Singh, Prayagraj (IN); Akshay Minocha, Bengaluru (IN)

(73) Assignee: BrowserStack Limited, Dublin (IE)

( * ) Notice: Subject to any disclaimer, the term of this patent is extended or adjusted under 35 U.S.C. 154(b) by 0 days.

(21) Appl. No.: 19/174,027

(22) Filed: Apr. 9, 2025

(51) Int. Cl.
*G06V 10/75* (2022.01)
*G06T 11/00* (2006.01)
*G06V 10/762* (2022.01)

(52) U.S. Cl.
CPC .......... *G06V 10/7515* (2022.01); *G06T 11/00* (2013.01); *G06V 10/762* (2022.01)

(58) Field of Classification Search
CPC ... G06V 10/7515; G06V 10/762; G06T 11/00
See application file for complete search history.

(56) References Cited

U.S. PATENT DOCUMENTS

| 5,956,435 | A  | * | 9/1999  | Buzug    | G06F 18/22 |
|           |    |   |         |          | 382/168    |
| 2005/0094862 | A1 | * | 5/2005  | Shimura  | G06T 7/001 |
|           |    |   |         |          | 382/141    |
| 2019/0318706 | A1 | * | 10/2019 | Peng     | G09G 3/007 |
| 2019/0333221 | A1 | * | 10/2019 | Nakagomi | G06T 5/50  |
| 2020/0014820 | A1 | * | 1/2020  | Imaizumi | H04N 1/4072 |
| 2020/0322546 | A1 | * | 10/2020 | Carolus  | H04N 23/55 |
| 2022/0114697 | A1 | * | 4/2022  | Monden   | H04N 9/646 |
| 2022/0270243 | A1 | * | 8/2022  | Kikuchi  | G06T 7/0012 |
| 2022/0319198 | A1 | * | 10/2022 | Yasui    | G06V 10/774 |
| 2023/0267630 | A1 | * | 8/2023  | Shibusawa | G06V 10/751 |
|           |    |   |         |          | 382/154    |
| 2024/0037716 | A1 | * | 2/2024  | Imaizumi | G06V 10/758 |
| 2024/0078636 | A1 | * | 3/2024  | Nielsen  | G01R 33/5608 |
| 2024/0303884 | A1 | * | 9/2024  | Deng     | G06T 9/00  |

\* cited by examiner

*Primary Examiner* — Ming Y Hon
(74) *Attorney, Agent, or Firm* — Cognition IP, P.C.; Edward Steakley; Saleh Kaihani

(57) ABSTRACT

An image difference generator can receive first and second screenshots of first and second display outputs of a computer program. The image difference generator can be configured to generate a difference image between the two screenshots. The difference image can be generated to exclude minor changes, such as slight horizontal or vertical shift in the same content or graphics between the two screenshots.

17 Claims, 7 Drawing Sheets

IMAGE DIFFERENCE GENERATOR WITH SHIFT DETECTION

BACKGROUND

Field

This invention relates generally to software development tools, and more particularly to tools directed to visual testing of the output of a software.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Image difference generators can be a powerful tool for software development. They can be used to quickly and efficiently inspect the display output of a computer program, as the software developer writes codes and scripts. Image difference generators can be used to highlight the difference in the display output of a computer program, for example, to compare different versions of a computer program, in terms of their display output. Some image difference generators do not include features to identify minor shifts in the display output, including slight shifts in the positioning of the same content or graphics in the output of a computer program. A robust image difference generator can exclude minor changes from its output, while more prominently highlighting more important or substantial differences in the display output of a computer program.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1:
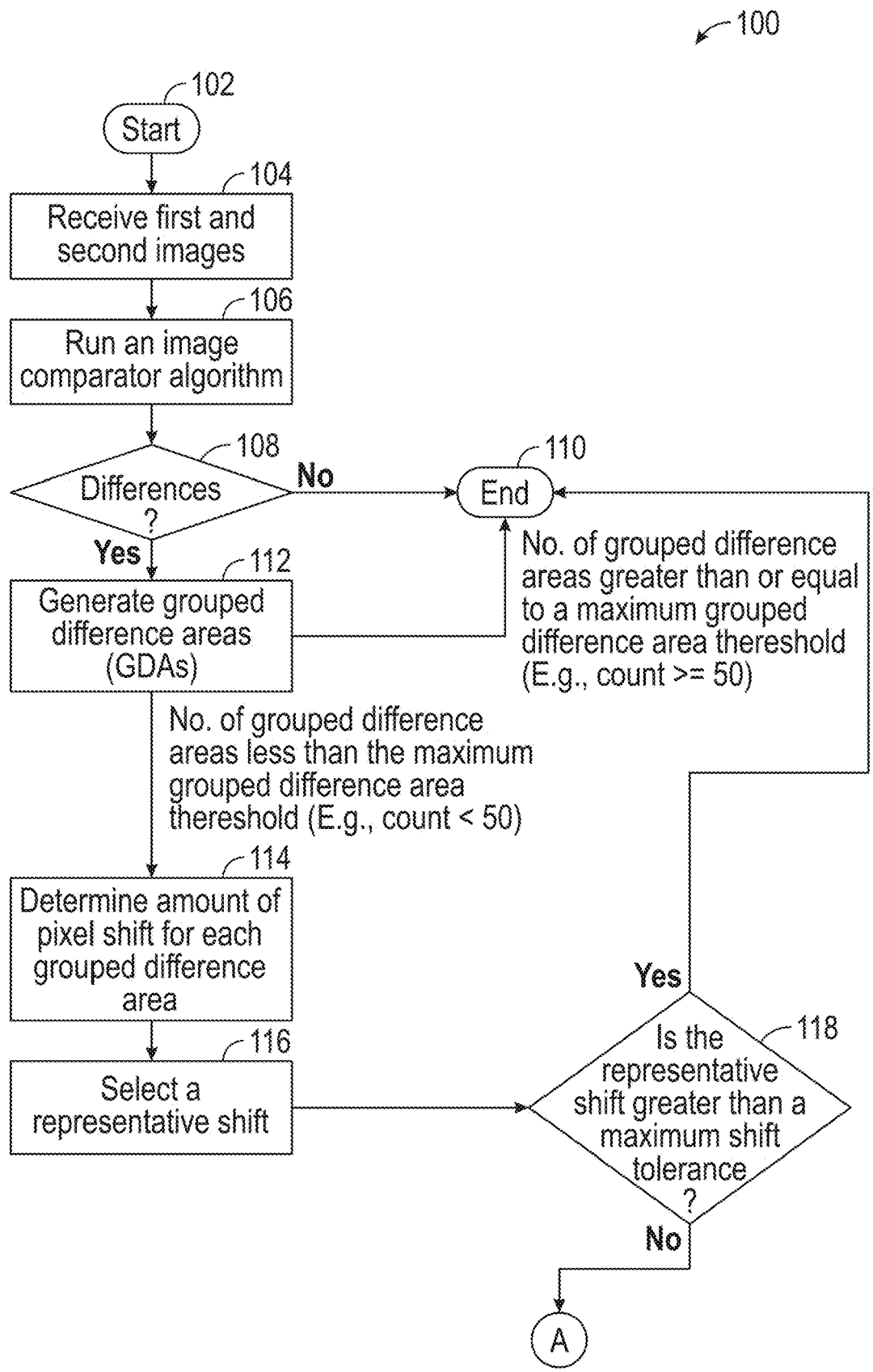
FIG. 1 illustrates a flowchart of a method of an image difference generator (IDG), which can minimize or reduce the amount of false positive differences.
Figure 1:
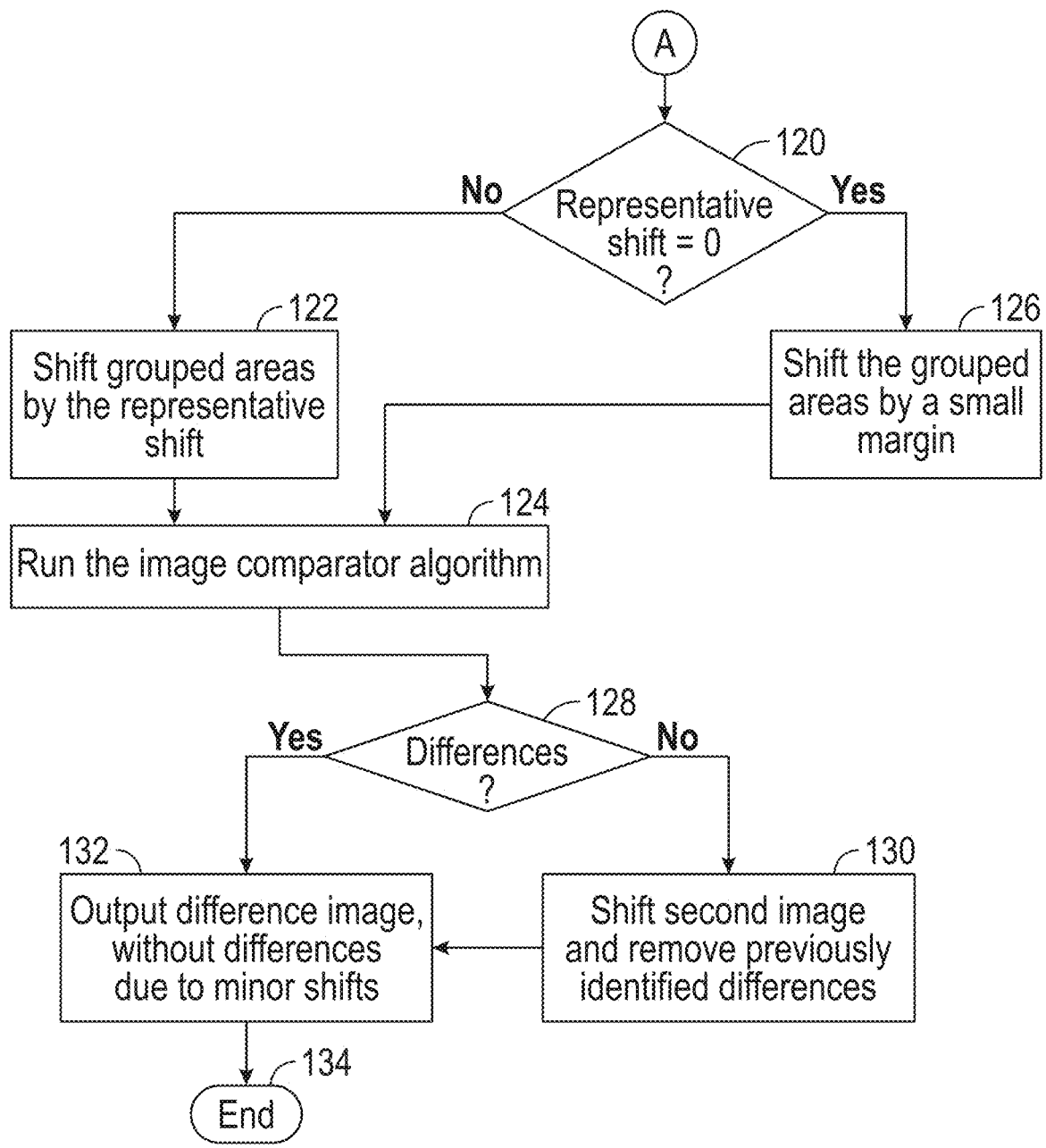

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Software development tools (SDTs) can allow a developer to write software code, and test the code using the same user interface. In this manner, the developer can quickly observe the output of the software, in relation to a recent change in the code. In some respects, the tools can provide both functional testing and visual testing. Functional testing can refer to examining the correct responsiveness of the software for tasks and workflows that relate to the behavior of the software and the outcome or output of the software, which may or may not accompany a visual output. Example of functional testing can include testing the functionality of a shopping cart feature of a website, ability of a script to perform its intended function, and testing the ability of an email generator to compose and send automated emails. Developers also utilize visual testing tools, to examine the display output of a software. For example, website developers write and change the code of a website and test the website. In addition to functional testing, website developers are also interested in performing visual testing. Visual testing can include observing the output of the software to test whether the desired changes have been rendered. Visual testing can also include observing the output of the software to test whether undesirable changes are introduced after a recent change in the code of the software. For example, a developer may change the shopping cart code of a website. The developer may be interested in performing visual testing of the relevant webpages before and after the code change, to test whether any undesirable visual and display changes may have been introduced, after the change in the code.

Image difference generators (IDGs) can receive two images of the display output of a software (e.g., webpages of a website) and flag or otherwise highlight the differences between two versions of the display output. As software display outputs (e.g., webpages) can include numerous elements, IDGs can help developers quickly identify and visually inspect the areas of difference to determine whether they are desirable or undesirable changes. IDGs can be helpful tools, but their usefulness is sometimes diminished if they flag or highlight minor differences, that are sometimes undetectable by a human eye and therefore inconsequential in terms of software development.

In the area of website and webpage development, a browser's rendering of a webpage can have minor differences, that can in some cases also be unrelated to any changes in the webpage code. These minor differences can include some areas of the webpage shifting by one or two pixels, slight font differences, slight color intensity, and other similar changes that are often difficult if not impossible to perceive with the naked human eye but can nevertheless be highlighted by IDGs as differences in the image. Such false positive highlighting of minor differences can distract the developer and reduce his coding efficiency. More robust IDGs can be integrated into SDTs, or applied independently to highlight more substantive differences, with less false positives.

Minor image differences be due to various factors, unrelated to the webpage code. For example, minor differences can arise due to approximations made by browsers, pixel rounding by the browsers, where fractional pixels get rounded differently, shifting webpage element positions slightly, sub-pixel rendering, where anti-aliasing and sub-pixel adjustments can vary, altering text or line thickness, graphics processing unit (GPU) rendering webpage graphics differently, where different graphics settings can make colors or positions appear slightly different. Some other hardware/software factors that can contribute to minor visual changes can include, memory changes, where high memory use can delay rendering, causing webpage elements to move slightly. Screen settings can change the layout of a webpage, making elements shift or resize a bit. In general, such minor visual differences can indeterministically appear between the same version of the display outputs of a program. These minor visual shifts are in many cases not visible by the naked eyes but can be highlighted by an IDG. A robust IDG can identify minor visual differences as false positives and not highlight them or highlight them differently than the more substantive visual differences. At the same time, a robust IDG still flags changes due to code change and changes that are perceptible by a human eye.

FIG. 1 illustrates a flowchart of a method 100 of an image difference generator (IDG), which can reduce the amount of false positive differences. While the method is described in the context of a developer utilizing the IDG for developing a webpage, the method can be applied to any software. The method starts at step 102. At step 104, the IDG receives first and second images. For example, the first and second images can be screenshots of a webpage, generated at different times. The first image can be a screenshot of a webpage before a developer modifies the webpage code. The second image can be a second screenshot of the same webpage, obtained after the developer has modified the webpage code. The method 100 can be used to generate and output a difference image between the first and second images, where minor changes are not highlighted or highlighted differently, but substantive, human-discernable changes are highlighted more prominently.

Step 106 includes running an image comparator algorithm. Various image comparator algorithms can be used. One example includes, utilizing the image difference generator, described in U.S. Pat. No. 11,625,908, issued on Apr. 11, 2023 and entitled, "Image Difference Generator," the content of which are hereby incorporated in its entirety, and should be considered a part of this disclosure.

Step 108 includes determining whether the image comparator algorithm at step 106 has returned any differences between the two images. If no differences are determined, the method ends at step 110. This can include outputting a blank difference image to indicate to the developer that no changes have been detected between the two images of the webpage. If differences are detected, the method proceeds to step 112. Step 112 includes identifying and grouping difference areas between the two images. In other words, step 112 includes generating grouped difference areas (GDAs). In some embodiments, generating groupings of the difference areas can include selecting a box of preselected size, for example, a six-pixel by six-pixel wide box, around a difference area, as identified by the image comparator algorithm of step 106, checking for nearby additional difference areas, and incrementally increasing the size of the box to include the nearby difference areas, until no additional difference areas can be detected. Which difference areas can be considered nearby difference areas to the box can be determined using a threshold method. For example, difference areas within two-pixels of the box in any direction can be considered a nearby difference area.

If the number of the grouped difference areas is equal to or exceeds a maximum grouped difference area (MGDA) threshold, likely the images contain substantial differences, not of the false positive kind. In this scenario, the method ends at step 110, which can include outputting a difference image with all the differences identified at step 106, 108, highlighted. The MGDA threshold can be empirically determined. For example, in some embodiments, an MGDA threshold of 50 can be selected.

If the number of grouped difference areas (GDAs) is less than the MGDA threshold, the method moves to step 114. The step 114 includes determining an amount of pixel shift for each grouped difference area (GDA), between the first and second images. The amount of pixel shift for a GDA can be returned in the form of a coordinate, (x,y), where the "x" coordinate indicates the amount of shift of the GDA in the horizontal direction and the "y" coordinate indicates the amount of shift of the GDA in the vertical direction. Moving the GDA in the second image by the amount of the pixel shift would generate matching areas in that region of the second image, compared to the first image. As an example, a pixel of shift of (0,1) for a GDA can indicate that in the second image, the GDA has not moved in the horizontal direction, but has moved up by a pixel. Therefore, shifting the GDA by one pixel in the vertical direction can eliminate the GDA, producing identical areas in both images. In some embodiments, step 114 can include using a phase correlation algorithm on each GDA, and obtaining a pixel shift for each GDA.

Step 116 includes selecting a representative shift from among the pixel shifts returned at step 114. In some embodiments, the representative shift can be the most frequently occurring pixel shift among the pixel shifts returned for the GDAs. For example, step 112 can generate five GDAs, and step 114 can return five pixel shifts, (0, 1), (0, 1), (0, 1), (−1, 0), and (2, 0) for the five GDAs. The most frequently occurring pixel shift between these five pixel shifts is (0, 1), which can be selected as the representative shift at step 116.

Step 118 includes determining whether the representative shift is greater than a maximum shift tolerance. If the representative shift is greater than the maximum shift tolerance, the images likely include more than minor differences. The method then ends at step 110 by outputting a difference image, without further attempting to identify minor changes to exclude from the output difference image. The maximum shift tolerance can be selected thresholds in the horizontal and/or vertical directions. For example, in some embodiments, maximum shift tolerance in the horizontal and vertical directions can be three pixels each. This threshold tolerance can translate to any images having a representative shift more than three pixels in the horizontal and vertical direction, likely contains more than minor changes. Other tolerances can also be selected for the maximum shift tolerance. In some embodiments, the maximum shift tolerance can be empirically determined.

If the representative shift is less than the maximum shift tolerance, the method moves to step 120. Step 120 includes determining whether the representative shift equals zero. If the representative shift is not zero, the method moves to step 122. Step 122 includes shifting the GDAs by the amount of the representative shift. Next, step 124 includes running the image comparator algorithm of step 106 again. In some cases, step 114 can erroneously determine no differences between the images, causing a representative shift of zero. If at step 120, it is determined that the representative shift is zero, step 126 is triggered to continue examining the images for potential differences, that may be more than minor. Step 126 includes shifting the grouped areas by a small, selected margin.

For example, in some embodiments, step 126 includes shifting the grouped areas by one pixel in all directions. In other words, for a representative shift of zero, the IDG can force a shift of one pixel in top, bottom, left and right directions to determine in subsequent steps, whether there are any more than minor changes. After shifting the grouped areas in step 126, step 124 is performed, which can include running the image comparator of the step 104 on the image with shifted grouped areas, relative to the same areas in the first image. Step 128 includes determining whether there are any differences between the image with shifted group areas and the first image. If there are no differences between the image with the shifted areas and the first image, it can indicate that the differences identified at step 108 in the GDAs were minor and can safely be ignored in the output. The method moves to step 130, where the second image is shifted by the amount of representative shift or by the shift introduced at step 126, as the case maybe, and the method moves to step 132, where a difference image is generated, based on the second image shifted in the GDAs. The shift introduced in step 130 eliminates or reduces the minor shifts and leaves only the more substantial differences. If at step 128, it is determined that the image with shifted GDAs still contains differences with the first image, the method, skips step 130 and moves to step 132, thereby skipping the shifting of the second image. In other words, at step 132, a difference image is generated, without shifting the second image, causing all identified GDAs to be highlighted in the output image, produced at step 132. The method ends at step 134.

Figure 2:
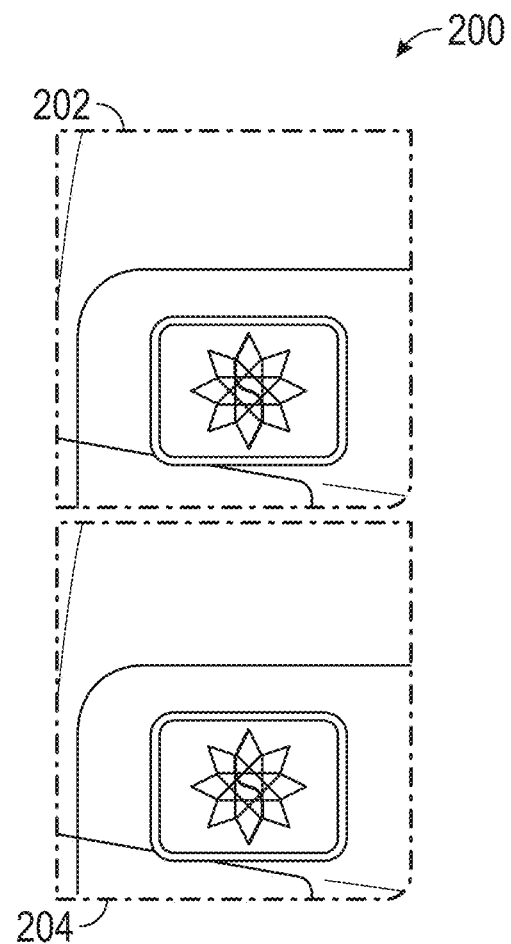
FIG. 2 illustrates a diagram of an example of minor changes that the described embodiments can exclude from a difference image.
Figure 2:
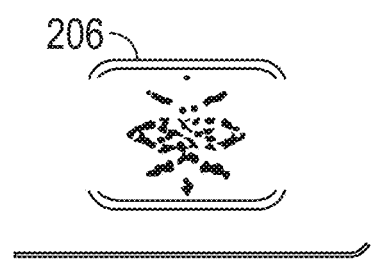

FIG. 2 illustrates a diagram 200 of an example of minor changes that the described embodiments can exclude from a difference image. The images 202 and 204 are practically identical, except one is shifted a row or two of pixels. Imperceptible to the human eye, nevertheless, an image difference generator not configured with the described embodiments, can generate a difference image 206, highlighting a substantial portion of the images as meaningful differences, not realizing that the two images are the same, only slightly shifted.

Figure 3:
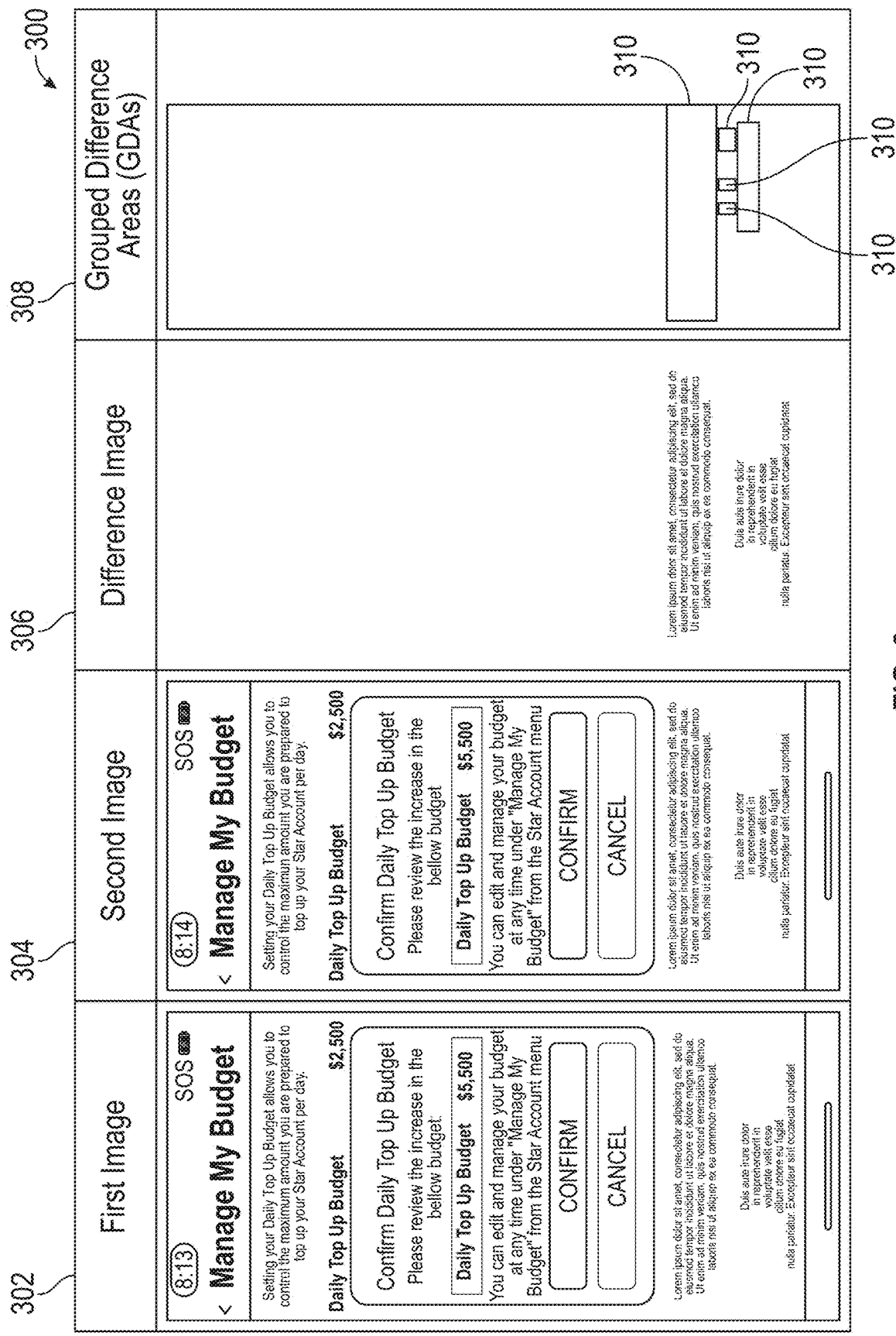
FIG. 3 illustrates screenshots of a first, and second images, a difference image and the grouped difference areas (GDAs).

FIG. 3 illustrates screenshots 300 of a first, and second images, a difference image and the grouped difference areas (GDAs). The first image 302 is a first version of a webpage or webpage element. The second image 304 is a second version of the same webpage or webpage element. Both can be screenshots of the webpage or webpage elements obtained at different times. The two images are nearly identical, but for a shift of a few pixels in the vertical direction. The changes between the first and second images are minor. The difference image 306, nevertheless highlights the changes. The described embodiments, including the method 100, can be used to generate grouped difference areas (GDA). The screenshot 308 shows the GDAs 310. In this example, five GDAs are determined. A final difference image can exclude the 5 GDAs as minor changes.

Figure 4:
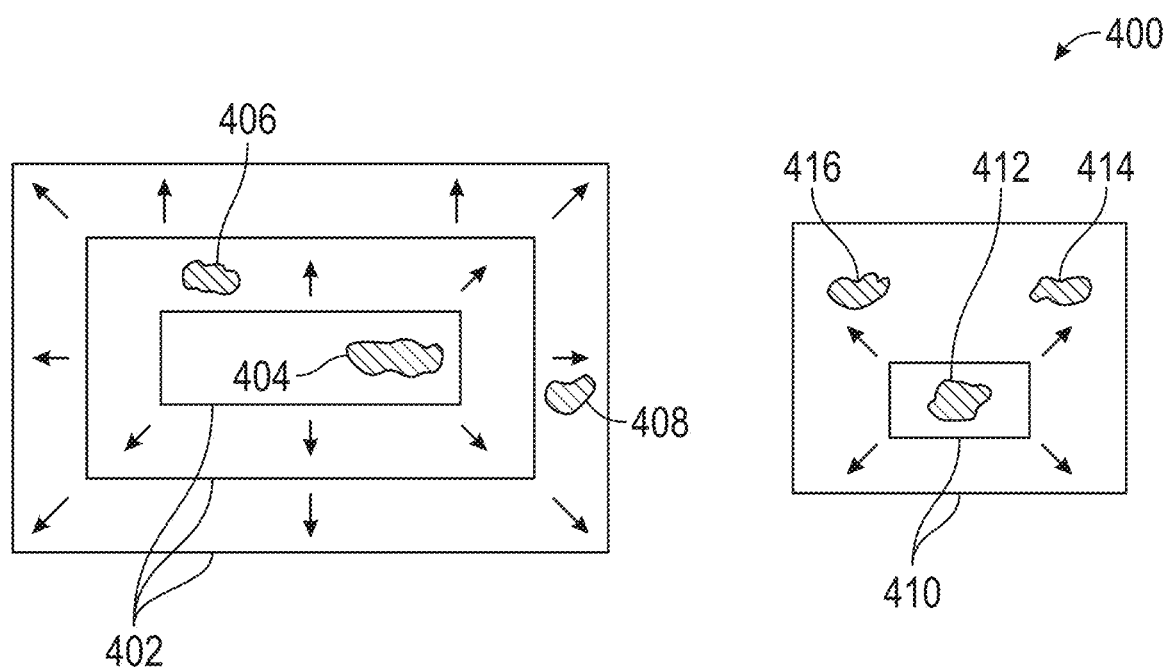
FIG. 4 illustrates diagrams of determining groupings for the difference areas.

FIG. 4 illustrates diagrams 400 of determining groupings for the difference areas. A box 402 of a selected size (for example, 15 pixels by 5 pixels) around a first difference area 404 is drawn. A second difference area 406 near the box 402 is determined. The size of the box 402 is increased to include the second difference area 406. A third difference area 408 near the resized box 402 is determined. The size of the box 402 is again increased to include the third difference area 408. The process is repeated and the size of the box 402 is correspondingly increased, until no more nearby difference areas can be determined. At that point, the box 402 and all the difference areas included in can be designated a GDA. A second box 410 can be drawn around a fifth difference area 412. The size of the box 410 is incrementally increased to include more nearby difference areas 414, 416, until no more nearby difference areas can be detected. At that point, the second box 410 can be designated another GDA.

Figure 5:
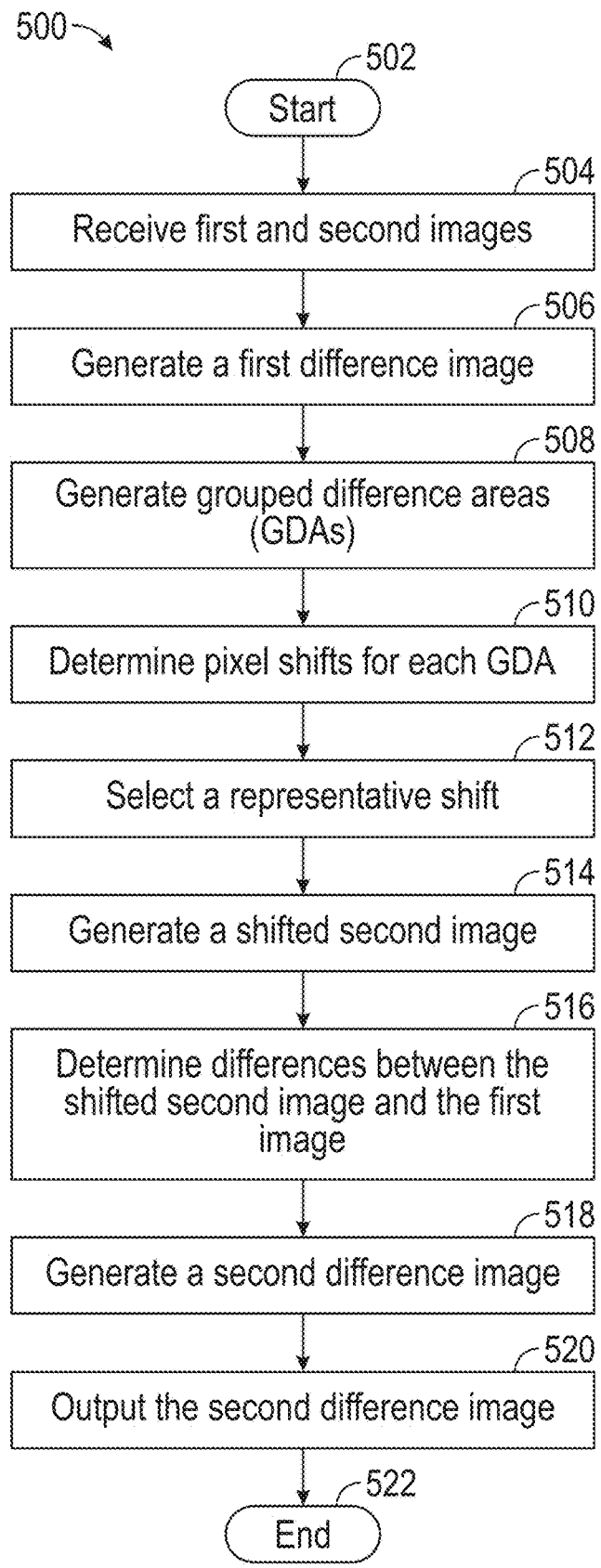
FIG. 5 illustrates a flowchart of another example method of generating an image difference, with the minor changes excluded.

FIG. 5 illustrates a flowchart of example method 500 of generating an image difference, with the minor changes excluded. The method starts at step 502. At step 502, first and second images are received. Step 506 includes generating a first difference image. Step 508 includes generating grouped difference areas (GDAs). Step 510 includes determining pixel shifts for each GDA. Step 512 includes selecting a representative shift. Step 514 includes generating a shifted second image, by shifting the second image in an amount equal to the representative shift. Step 516 includes determining differences between the shifted second image and the first image. Step 518 includes generating a second difference image, based on the differences determined at step 516. If the differences at step 516 are zero, it can indicate the changes due to the GDAs are minor changes and can be safely removed from the output. In this scenario, the second difference image can be generated by removing the GDAs from the first difference image. In some embodiments, to generate the output second difference image, the second image can be shifted by the representative shift, inverted and added to the first image. The result is the difference between the first image and the shifted second image, with the GDAs removed. The result can be output as the second difference image at step 520.

If the determined differences at step 516 are nonzero, this can indicate the differences are not minor and can be kept in the output second difference image. In this scenario, the first difference image can be used as the second image difference and output as the second difference image at step 520. The method ends at step 522.

Figure 6:
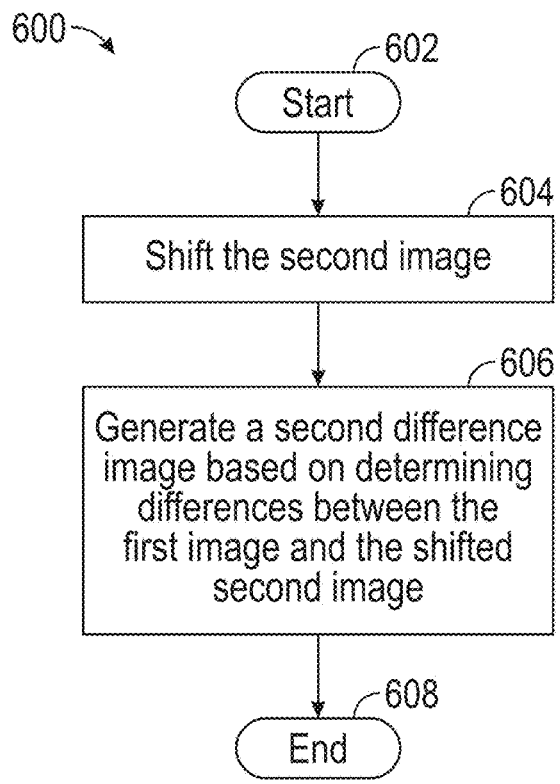
FIG. 6 illustrates a flowchart of an example method 600 for generating a second difference image, which can be used in the embodiment of FIG. 5.

FIG. 6 illustrates a flowchart of an example method 600 for generating a second difference image with minor changes excluded. The method 600 can be utilized as part of step 518 in method 500, when step 516 in method 500 determines there are differences between the shifted second image and the first image. The method 600 starts at step 602. At step 604, the second image is shifted by the representative shift, generating a shifted second image. Step 606 includes generating a second difference image, based on determining differences between the first image and the shifted second image. For example, the second difference image can be generated by inverting the shifted second image and adding the inverted second image to the first image. In some embodiments, the inversion and addition can be performed on a pixel-by-pixel basis. The method ends at step 608.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 7:
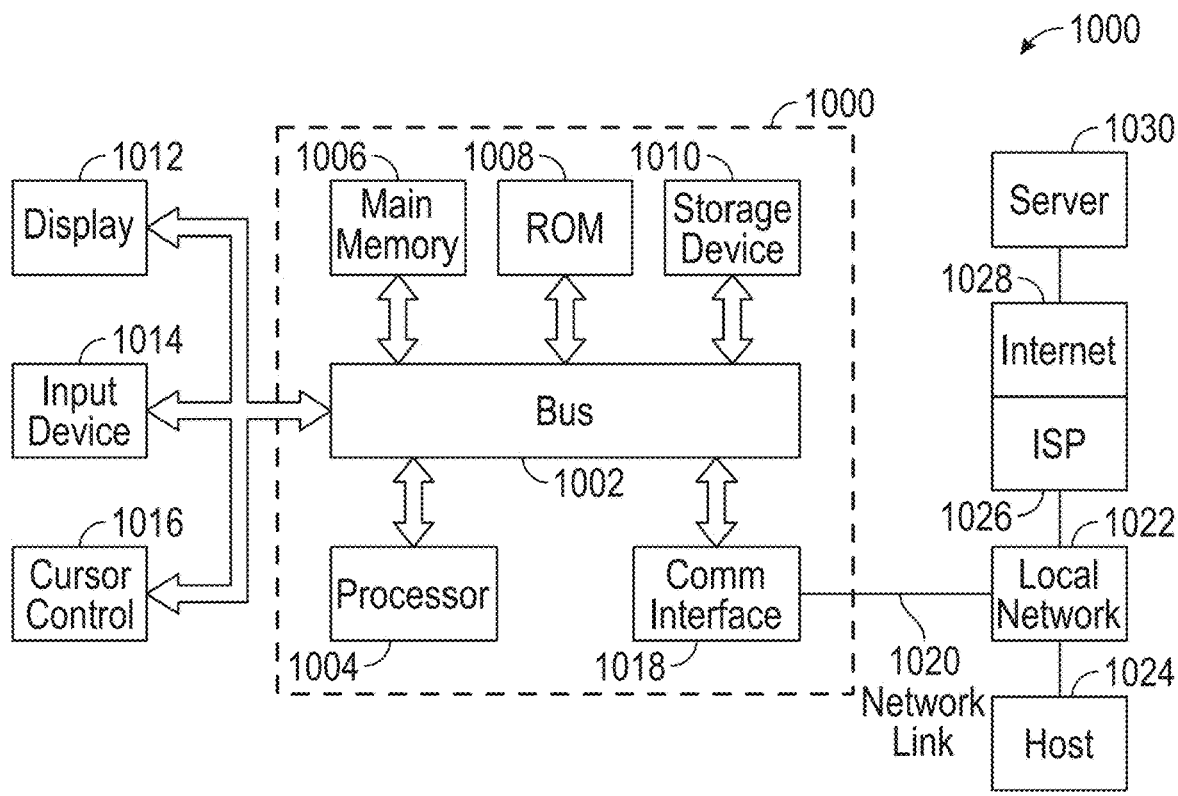
FIG. 7 illustrates an environment in which some embodiments may operate.

For example, FIG. 7 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving first and second images; generating a first difference image by determining difference areas between the first and second images; grouping the difference areas, generating grouped difference areas (GDAs); determining, for each GDA, an amount of pixel shift between the first and second images; selecting a representative shift; generating a shifted second image, by shifting the GDAs in the second image, by the representative shift; determining differences between the shifted second image and the first image; when determining no differences between the shifted second image and the first image, removing the GDAs from the first difference image and outputting the first difference image, with the GDAs removed; and when determining differences between the shifted second image and the first image, outputting the first difference image.

Example 2: The method of Example 1, wherein removing the GDAs from the first difference image and outputting the first difference image, with the GDAs removed, comprises: shifting the second image by the representative shift, generating a second difference image between the first image and the shifted second image, based on determining differences between the first image and the shifted second image; and outputting the second difference image.

Example 3: The method of some or all of Examples 1 and 2, wherein grouping the difference areas comprises: selecting a box of a selected size around a difference area; determining a difference area near the outside perimeter of the box; and iteratively expanding the size of the box to include nearby difference areas, until no nearby difference areas can be found.

Example 4: The method of some or all of Examples 1-3, wherein determining pixel shifts is based on a phase correlation algorithm.

Example 5: The method of some or all of Examples 1-4, wherein the representative shift is a pixel shift occurring with maximum frequency among the determined pixel shifts.

Example 6: The method of some or all of Examples 1-5, further comprising: when the representative shift equals zero, generating the shifted second image by shifting the GDAs by a small margin.

Example 7: The method of some or all of Examples 1-6, further comprising when the representative shift is greater than a maximum shift tolerance, outputting the first difference image.

Example 8: A non-transitory computer storage medium that stores executable program instructions that, when executed by one or more computing devices, configure the one or more computing devices to perform operations comprising: receiving first and second images; generating a first difference image by determining difference areas between the first and second images; grouping the difference areas, generating grouped difference areas (GDAs); determining, for each GDA, an amount of pixel shift between the first and second images; selecting a representative shift; generating a shifted second image, by shifting the GDAs in the second image, by the representative shift; determining differences between the shifted second image and the first image; when determining no differences between the shifted second image and the first image, removing the GDAs from the first difference image and outputting the first difference image, with the GDAs removed; and when determining differences between the shifted second image and the first image, outputting the first difference image.

Example 9: The non-transitory computer storage of Example 8, wherein removing the GDAs from the first difference image and outputting the first difference image, with the GDAs removed, comprises: shifting the second image by the representative shift, generating a second difference image between the first image and the shifted second image, based on determining differences between the first image and the shifted second image; and outputting the second difference image.

Example 10: The non-transitory computer storage of some or all of Examples 8 and 9, wherein grouping the difference areas comprises: selecting a box of a selected size around a difference area; determining a difference area near the outside perimeter of the box; and iteratively expanding the size of the box to include nearby difference areas, until no nearby difference areas can be found.

Example 11: The non-transitory computer storage of some or all of Examples 8-10, wherein determining pixel shifts is based on a phase correlation algorithm.

Example 12: The non-transitory computer storage of some or all of Examples 8-11, wherein the representative shift is a pixel shift occurring with maximum frequency among the determined pixel shifts.

Example 13: The non-transitory computer storage of some or all of Examples 8-12, wherein the operations further comprise: when the representative shift equals zero, generating the shifted second image by shifting the GDAs by a small margin.

Example 14: The non-transitory computer storage of some or all of Examples 8-13, wherein the operations further comprise: when the representative shift is greater than a maximum shift tolerance, outputting the first difference image.

Example 15: A system comprising one or more processors, wherein the one or more processors are configured to perform operations comprising: receiving first and second images; generating a first difference image by determining difference areas between the first and second images; grouping the difference areas, generating grouped difference areas (GDAs); determining, for each GDA, an amount of pixel shift between the first and second images; selecting a representative shift; generating a shifted second image, by shifting the GDAs in the second image, by the representative shift; determining differences between the shifted second image and the first image; when determining no differences between the shifted second image and the first image, removing the GDAs from the first difference image and outputting the first difference image, with the GDAs removed; and when determining differences between the shifted second image and the first image, outputting the first difference image.

Example 16: The system of Example 15, wherein removing the GDAs from the first difference image and outputting the first difference image, with the GDAs removed, comprises: shifting the second image by the representative shift, generating a second difference image between the first image and the shifted second image, based on determining differences between the first image and the shifted second image; and outputting the second difference image.

Example 17: The system of some or all of Examples 15 and 16, wherein grouping the difference areas comprises: selecting a box of a selected size around a difference area; determining a difference area near the outside perimeter of the box; and iteratively expanding the size of the box to include nearby difference areas, until no nearby difference areas can be found.

Example 18: The system of some or all of Examples 15-17, wherein determining pixel shifts is based on a phase correlation algorithm.

Example 19: The system of some or all of Examples 15-18, wherein the representative shift is a pixel shift occurring with maximum frequency among the determined pixel shifts.

Example 20: The system of some or all of Examples 15-19, wherein the operations further comprise: when the representative shift equals zero, generating the shifted second image by shifting the GDAs by a small margin.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
receiving first and second images;
generating a first difference image by determining difference areas between the first and second images;
grouping the difference areas, generating grouped difference areas (GDAs);
determining, for each GDA, an amount of pixel shift between the first and second images;
selecting a representative shift, wherein the representative shift is a pixel shift occurring with maximum frequency among the determined pixel shifts of the GDAs;
generating a shifted second image, by shifting the GDAs in the second image, by the representative shift;
determining differences between the shifted second image and the first image;
when determining no differences between the shifted second image and the first image, removing the GDAs from the first difference image and outputting the first difference image, with the GDAs removed; and
when determining differences between the shifted second image and the first image, outputting the first difference image; and
generating an output difference display of the first and second images with minor differences between the first and second images excluded from the output difference display.

2. The method of claim 1, wherein removing the GDAs from the first difference image and outputting the first difference image, with the GDAs removed, comprises:
shifting the second image by the representative shift,
generating a second difference image between the first image and the shifted second image, based on determining differences between the first image and the shifted second image; and
outputting the second difference image.

3. The method of claim 1, wherein grouping the difference areas comprises:
selecting a box of a selected size around a difference area;
determining a difference area near the outside perimeter of the box; and
iteratively expanding the size of the box to include nearby difference areas, until no nearby difference areas can be found.

4. The method of claim 1, wherein determining pixel shifts is based on a phase correlation algorithm.

5. The method of claim 1, further comprising:
when the representative shift equals zero, generating the shifted second image by shifting the GDAs by a small selected margin.

6. The method of claim 1, further comprising when the representative shift is greater than a maximum shift tolerance, outputting the first difference image.

7. A non-transitory computer storage medium that stores executable program instructions that, when executed by one or more computing devices, configure the one or more computing devices to perform operations comprising:
receiving first and second images;
generating a first difference image by determining difference areas between the first and second images;
grouping the difference areas, generating grouped difference areas (GDAs);
determining, for each GDA, an amount of pixel shift between the first and second images;
selecting a representative shift, wherein the representative shift is a pixel shift occurring with maximum frequency among the determined pixel shifts of the GDAs;
generating a shifted second image, by shifting the GDAs in the second image, by the representative shift;
determining differences between the shifted second image and the first image;
when determining no differences between the shifted second image and the first image, removing the GDAs from the first difference image and outputting the first difference image, with the GDAs removed; and
when determining differences between the shifted second image and the first image, outputting the first difference image; and
generating an output difference display of the first and second images with minor differences between the first and second images excluded from the output difference display.

8. The non-transitory computer storage of claim 7, wherein removing the GDAs from the first difference image and outputting the first difference image, with the GDAs removed, comprises:
shifting the second image by the representative shift,
generating a second difference image between the first image and the shifted second image, based on determining differences between the first image and the shifted second image; and
outputting the second difference image.

9. The non-transitory computer storage of claim 7, wherein grouping the difference areas comprises:
selecting a box of a selected size around a difference area;
determining a difference area near the outside perimeter of the box; and
iteratively expanding the size of the box to include nearby difference areas, until no nearby difference areas can be found.

10. The non-transitory computer storage of claim 7, wherein determining pixel shifts is based on a phase correlation algorithm.

11. The non-transitory computer storage of claim 7, wherein the operations further comprise:
when the representative shift equals zero, generating the shifted second image by shifting the GDAs by a small selected margin.

12. The non-transitory computer storage of claim 7, wherein the operations further comprise: when the representative shift is greater than a maximum shift tolerance, outputting the first difference image.

13. A system comprising one or more processors, wherein the one or more processors are configured to perform operations comprising:
receiving first and second images;
generating a first difference image by determining difference areas between the first and second images;
grouping the difference areas, generating grouped difference areas (GDAs);
determining, for each GDA, an amount of pixel shift between the first and second images;
selecting a representative shift, wherein the representative shift is a pixel shift occurring with maximum frequency among the determined pixel shifts of the GDAs;

generating a shifted second image, by shifting the GDAs in the second image, by the representative shift;

determining differences between the shifted second image and the first image;

when determining no differences between the shifted second image and the first image, removing the GDAs from the first difference image and outputting the first difference image, with the GDAs removed; and when determining differences between the shifted second image and the first image, outputting the first difference image; and generating an output difference display of the first and second images with minor differences between the first and second images excluded from the output difference display.

14. The system of claim 13, wherein removing the GDAs from the first difference image and outputting the first difference image, with the GDAs removed, comprises: shifting the second image by the representative shift, generating a second difference image between the first image and the shifted second image, based on determining differences between the first image and the shifted second image; and outputting the second difference image.

15. The system of claim 13, wherein grouping the difference areas comprises:

selecting a box of a selected size around a difference area;

determining a difference area near the outside perimeter of the box; and iteratively expanding the size of the box to include nearby difference areas, until no nearby difference areas can be found.

16. The system of claim 13, wherein determining pixel shifts is based on a phase correlation algorithm.

17. The system of claim 13, wherein the operations further comprise:

when the representative shift equals zero, generating the shifted second image by shifting the GDAs by a small selected margin.

\* \* \* \* \*